Jan. 16, 1968

H. E. ANTRAM 3,363,958

POWER FILE LEVEL CONTROL

Filed Sept. 16, 1966

INVENTOR.
Howard E. Antram
BY
Frease & Bishop
ATTORNEYS

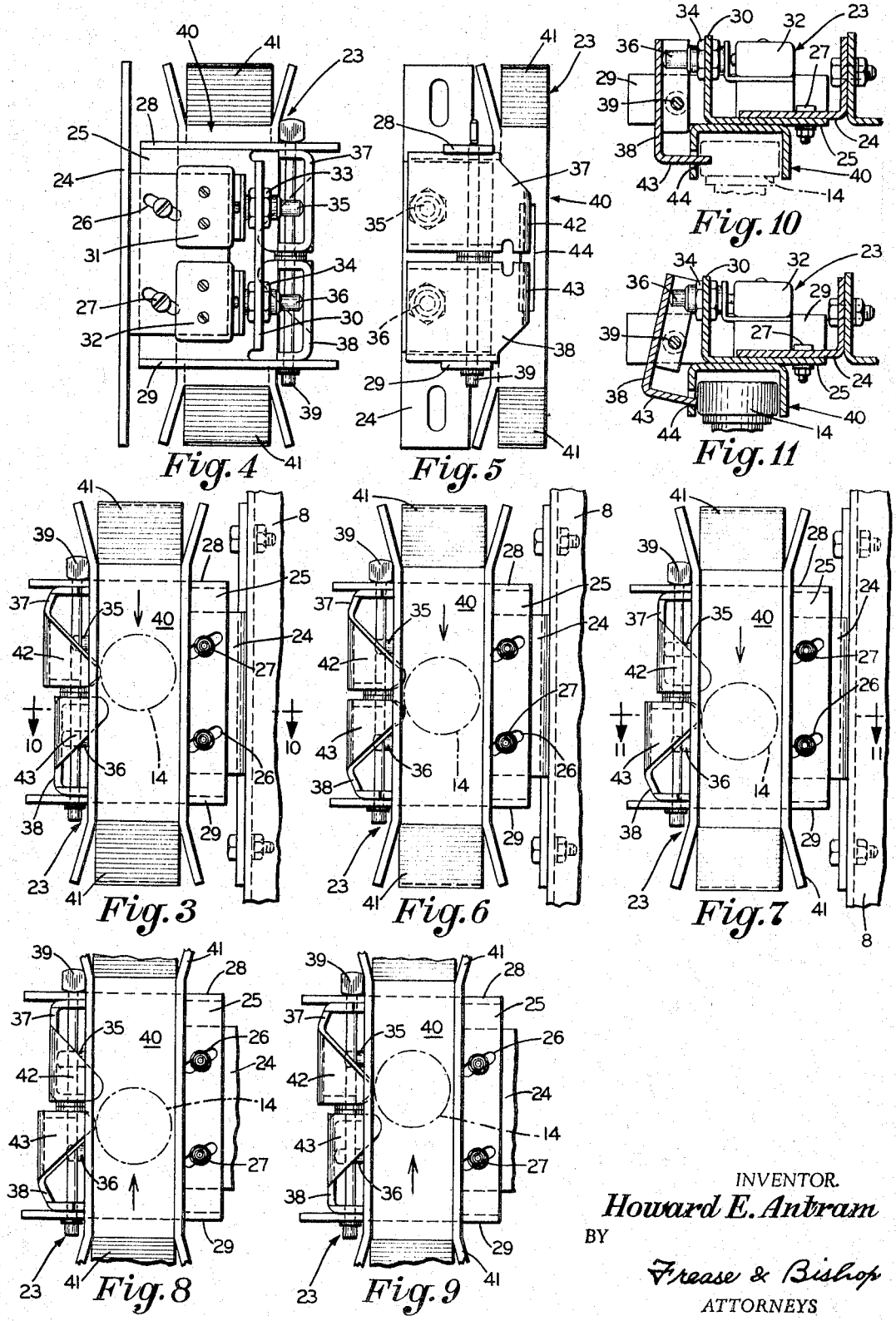

United States Patent Office 3,363,958
Patented Jan. 16, 1968

3,363,958
POWER FILE LEVEL CONTROL
Howard E. Antram, Waynesburg, Ohio, assignor to Diebold, Incorporated, Canton, Ohio, a corporation of Ohio
Filed Sept. 16, 1966, Ser. No. 580,113
5 Claims. (Cl. 312—268)

The invention comprises improvements upon certain of the constructions shown in the copending applications of Krug et al., filed Apr. 8, 1965, Ser. No. 446,682, now Patent No. 3,297,378 and Graber et al. Ser. No. 481,857, filed Aug. 23, 1965, now Patent No. 3,298,766 and the invention relates to elevator or power filing appliances of a type in which a plurality of pans are mounted on an endless conveyor for movement in either direction in a continuous orbit of travel so that any selected pan may be moved rapidly and delivered by power means to a work station, in which a drawer is supported on each pan on suspension mechanism which permits the drawer to be moved between retracted and extended positions at the work station, and in which level controller means including a level switch is used to control proper operation of components of the appliance, such as ejector mechanism for moving a pan located at the work station between retracted and extended positions; and more particularly the invention relates to level switch and control mechanism for controlling proper operation of the conveyor and related mechanisms to prevent appliance damage in event that any particular pan is not stopped at the proper level or location at the work station.

Prior filing appliances such as shown in said applications Ser. Nos. 446,682 and 481,857 have used level controller mechanism including a level switch actuated by means related to any particular pan that functions as an interlock or safety device to insure that a desired pan is at a proper level with respect to the work station, so that the drawer may be moved on the pan between retracted and extended positions at the work station without appliance damage.

Difficulties have been encountered with such prior level controller mechanism in appliance operation by manual control buttons which selectively are held in actuated position for driving the conveyor in one direction or the other. Sometimes the manual control button is held depressed too long while the desired pan moves toward the work station, and such pan may coast past the required location for movement of a drawer on the pan without damage.

Furthermore, such prior level controller mechanism requires closer switch, tripping mechanism and conveyor chain tension adjustments than can be made or maintained from a practical standpoint, in the construction and operation of mechanized filing appliances.

Further, complications have arisen in the operation of such prior level controller mechanism because, in making and maintaining level controller mechanism adjustments, of the impossibility of knowing whether a particular pan will arrive at the work station by "up" or "down" power driven conveyor motion. Pan coasting and other conditions upon arrival of a pan at the work station are different with respect to the two indicated directions of movement of any particular pan.

Furthermore, in prior arrangements unbalanced appliance conveyor loading when the appliance is being operated by automatic controls occassionally may cause coasting of a particular pan past the proper level at the work station, such that the automatic ejection of a drawer from a pan initiated when the selected pan arrives at the work station may cause damage.

Accordingly, it is the primary object of the invention to provide new level controller mechanism and level switch construction which insures that component mechanisms of the filing appliance may be operated only when any selected pan has stopped at a proper level at the work station, regardless of the direction of travel upon arrival at the work station; which eliminates the necessity of maintaining the close appliance adjustments heretofore required; which avoids the difficulties heretofore encountered with prior constructions; and which achieves the stated objects, solves problems and satisfies needs existing in the art.

These and other objects and advantages apparent from the following description may be obtained, the stated results achieved and the described difficulties overcome by the apparatus, combinations, parts, elements, subcombinations, mechanisms, arrangements and constructions which comprise the present invention, the nature of which is set forth in the following general statement, a preferred embodiment of which—illustrative of the best mode in which applicant has contemplated applying the principles —is set forth in the following description and shown in the drawings and which are particularly and distinctly pointed out and set forth in the appended claims forming part hereof.

The nature of the improved construction may be stated in general terms as including in a power file of the type in which a plurality of pans is mounted on an endless conveyor carried by support means for movement in either direction in a continuous orbit of travel having at least one flight of travel in a plane extending parallel with the orbital axes and any selected pan is delivered by power means to a predetermined work station, in which a movable member is supported on each pan adapted to be moved when any selected pan is at said predetermined work station location, in which the power means includes a drive motor operative to drive the conveyor in either direction, and in which manual control switch means is provided operative upon being manually held actuated selectively in up and down positions to energize up or down movement drive motor circuits for driving the conveyor respectively in up or down directions in said flight of travel past the work station; manual control mechanism for manually controlling movement of the power file including up and down holding control circuits operably connected respectively with said up and down movement drive motor circuits; conveyor operated level switch means operably connected with said up and down holding control circuits and said manual control switch means; said level switch means including a pair of switch elements located adjacent the path of conveyor travel, and level switch actuator means carried by the conveyor adapted successively to operate said pair of switch elements; said level switch means being constructed upon release from actuated position of said manual switch means prior to the arrival of a preselected pan at said predetermined work station location, to operate to maintain the driving motor energized through said holding circuits for conveyor movement until arrival of said preselected pan at said work station location, and to operate to stop said preselected pan at said predetermined work station location upon arrival at said work station location; said level switch means being constructed, when said manual control switch means is maintained actuated until arrival of said preselected pan at said work station, to operate to maintain said drive motor energized for continued conveyor movement; said pair of switch elements comprising an upper switch element having a pole connected in said down holding control circuit and a lower switch element having a pole connected in said up holding control circuit; preferably a movable drawer on each pan, drawer-moving mechanism for moving a drawer on a pan located at said predetermined work station location, control circuits for controlling opera-

3 tion of said drawer-moving mechanism, and said upper and lower switch elements each having poles operably connected in said drawer-moving circuits.

By way of example, an embodiment of the improved construction is shown in the accompanying drawings forming part hereof in which:

FIG. 3 is an enlarged side view of the improved level switch shown in FIG. 2 illustrating one state of actuation by a pan just arriving at the work station traveling in a "down" direction, the switch actuator on the pan being shown in dot-dash lines;

FIG. 4 is a rear view of the parts shown in FIG. 3;

FIG. 5 is a side view looking toward the right side of FIG. 4;

FIG. 6 is a view similar to FIG. 3 showing the condition of the level switch when the selected pan is in position at the work station at proper level;

FIG. 7 is a view similar to FIGS. 3 and 6 showing the condition of the level switch when a pan moving "down" has arrived at the work station and has coasted past the preferred proper position before stopping at the work station;

FIG. 8 is a view similar to FIGS. 3, 6 and 7 but showing level switch operation by a pan arriving at the work station traveling in "up" direction;

FIG. 9 is a view similar to FIG. 8 but showing the switch condition when a pan traveling "up" has coasted past preferred proper position before stopping at the work station;

FIG. 10 is a section looking in the direction of the arrows 10—10, FIG. 3;

FIG. 11 is a section looking in the direction of the arrows 11—11, FIG. 7; and

Similar numerals refer to similar parts throughout the various figures of the drawings.

Figure 1:
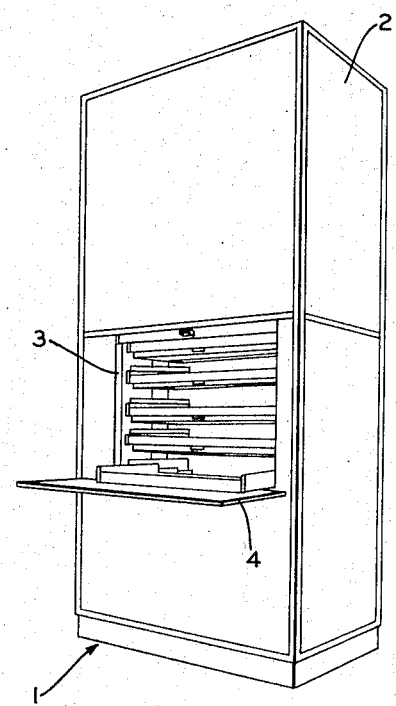
FIGURE 1 is a perspective view of a power filing appliance equipped with the new level controller mechanism.

The improved level controller mechanism in power files is illustrated and described in the drawings in connection with a power file of the general type shown in Krug et al. Pat. No. 3,166,366 or in said applications Ser. Nos. 446,682 and 481,857. Such a power file is indicated generally at 1 and may include a housing or cabinet 2, the front wall of which may be provided with an opening 3 above a counter or work station 4.

A pair of conveyor chains 5 trained over sprockets 6 and 7 mounted on upright support members 8 carried at 9 within housing 2 mount a series of pans 10 for movement in either direction in a continuous orbit of travel. Each pan 10 is mounted at each end on a pair of arms 11 fixed to a chain 5 and arms 11 pivotally support an end of a pan 10 at 12. A stabilizing arm 13 is fixed to each end of each pan 10 having a roller 14 at its outer end. Rollers 14 engage and are guided in movement around the upper and lower ends of the path of conveyor travel by curved guide channels 15 and 16 to maintain pans 10 in a horizontal position throughout the upper and lower ends of the orbit of travel on conveyor chains 5 when traveling around the sprockets 6 and 7. Horizontal positioning of pans 10 is maintained during travel in the vertical flights between sprockets 6 and 7 by engagement of a V-ear 17 at each end of one pan with the pivot means 12 of the pan next below.

Conveyor 5 is driven in a suitable manner from drive motor 18 (FIG. 12) which may be a reversing motor, operated preferably by selector switches and a rotary selector control switch, not shown, of a type such as shown in Pat. No. 3,198,894. The construction and operation of the conveyor, housing, etc. thus briefly described herein may be of the type shown in Pat. No. 3,199,658.

Power files shown in Pats. Nos. 3,198,894, 3,199,658 and 3,166,366 comprise a plurality of pans mounted on an endless conveyor for movement in either direction in a continuous orbit of travel. Any selected pan is delivered by power operation of the conveyor to a location opposite the work station 4. When delivered opposite such work station, a drawer on suspension mechanism on its pan may be moved between retracted and extended positions such as shown in dot-dash lines at 19 in FIG. 2, either manually or automatically by a power driven ejector mechanism such as shown in said applications Ser. Nos. 446,682 and 481,857, such ejector mechanism being generally indicated at 20 in FIG. 2.

Operation of conveyor 5 by drive motor 18 also may be accomplished manually by actuation of "up" or "down" buttons 21 or 22 (FIG. 12) instead of using selector switch operation.

Figure 2:
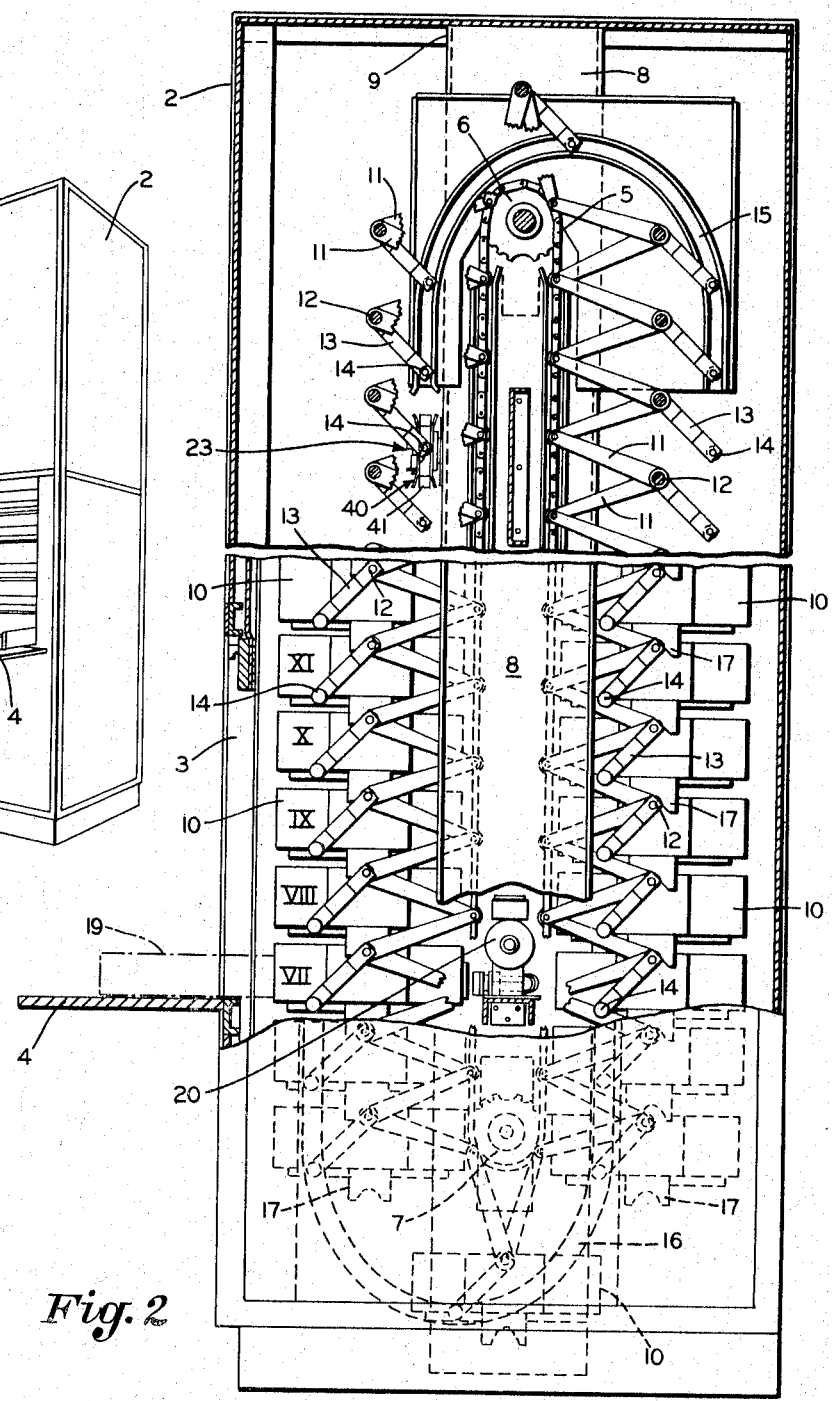
FIG. 2 is an enlarged side elevation with parts broken away and in vertical section at various locations, looking from the right side of FIG. 1 and showing the pans in full lines in one sectional portion, and showing the pan level control switch in full lines at another sectional portion.

In accordance with the invention, a level switch generally indicated at 23 forming part of level controller mechanism is mounted adjacent the path of conveyor travel (FIG. 2). Level switch 23 generally functions as an interlock or safety device to insure that a pan is at a proper level for its drawer to be ejected or moved to "out" position such as the drawer indicated at 19 in dot-dash lines in FIG. 2 at the work station 4. The spacing between pans 10 on the conveyor is uniform in the vertical path of travel, so that when one pan has its stabilizer roller 14 located at level switch 23 as indicated in FIG. 2, another pan 10 is opposite work station 4 and in position for its drawer 19 to be engaged by the drawer-moving mechanism 20 also indicated in FIG. 2.

In accordance with the invention, level switch 23 is constructed as shown in FIGS. 3 through 11 and includes an angle member 24 having a mounting plate 25 adjustably mounted on angle member 24 by a slot and bolt connection between members 24 and 25 including slots 26 formed in angle member 24 and adjusting bolts 27 engaged in slots 26 and bolted to plate 25. Plate 25 has a top flange 28, a bottom flange 29 and an end flange 30. A pair of switches 31 and 32 are mounted at 33 and 34 on end flange 30 having switch buttons 35 and 36, respectively. Switch buttons 35 and 36 are engaged by switch actuator members 37 and 38, respectively, which are pivotally mounted on a pivot pin 39 carried by mounting plate top and bottom flanges 28 and 29.

A channel member 40 is mounted on plate member 25 and channel member 40 has its flanges and web outwardly flared at each end as indicated at 41, so as to successively guide and trap the stabilizing roller 14 for each pan within channel 40 during conveyor movement. Actuator members 37 and 38 have turned ears 42 and 43, respectively, which project through a slot 44 (FIGS. 5, 10 and 11) formed in one of the flanges of channel member 40 to positions adapted to be engaged by a pan stabilizing roller 14 moving along channel member 40 in either direction. When either of ears 42 or 43 of actuator members 37 and 38 is engaged by a roller 14, as shown in FIGS. 3, 6, 7, 8, 9 and 11, the actuator member whose ear is engaged, depresses the corresponding switch button 35 or 36, as shown.

Referring to the wiring diagram (FIG. 12), wire 45 of power supply line wires 45 and 46 is connected by wire 47 with one set of contacts 48 and 49 of automatic-manual control switch 50. Switch 50 has other contacts 51 and 52.

Level control switch 31 has three poles LS9–A, LS9–B and LS9–C; and level control switch 32 has three poles LS8–A, LS8–B and LS8–C. LS9–A and LS9–C are normally closed while LS9–B is normally open; and similarly LS8–A and LS8–C are normally closed and LS8–B is normally open. Wire 53 connects wire 45 with one of the contacts of LS9–B, and by wire 54 with one of the contacts of LS8–B. The other contacts of switches LS8–B and LS9–B are connected by wires 55 and 56 to wire 57 which is connected to out-relay (OR) 58 which controls outward movement through out-relay contacts OR–1 of the pan motor 59 for the drawer-moving mechanism 20. Wire 54 is connected by wire 60 in series to switches LS9–C and LS8–C and then by wire 61 to in-relay (IR) 62 which controls inward or retraction movement of pan motor 59 through contacts IR–1. Pan motor 59 is supplied with power by line wires 63 and 64.

Contact 51 of automatic-manual control switch 50 is connected by wire 65 to selector switches indicated diagrammatically at 66, one being provided for each pan 10 for automatic operation. Selector switches 66 are electrically connected with rotary switch 67 which controls "up" and "down" movement of the conveyor through up-relay UR–2 and down-relay DR–2. Relay UR–2 is connected to rotary switch 67 by wire 68 and relay DR–2 is connected to rotary switch 67 by wire 69. Relays UR–2 and DR–2 are connected by wire 70 with power supply wire 46. As indicated by the dot-dash lines 71, relays UR–2 and DR–2 control operation of conveyor motor 18 through suitable conveyor motor controls diagrammatically indicated at 72 for selective "up" or "down" movement, conveyor motor 18 being supplied with power by line wires 73 and 74.

Contact 52 of automatic-manual control switch 50 is connected by wires 75, 76, 77 and 78 with contacts of switches LS8–A and LS9–A. The other contact of LS8–A is connected with up-holding control 79 and by wires 80 and 68 with conveyor motor up-relay UR–2. The other contact of LS9–A is connected with down-holding control 81 and by wires 82, 83 and 69 with conveyor motor down-relay DR–2. Wire 75 also is connected by wire 84 with manual control blade 85 adapted selectively to contact up-button 21 or down-button 22 for manual operation of conveyor motor 18. Up-button 21 is connected by wire 86 with wires 80 and 68; and down-button 22 is connected by wire 87 with wires 82, 83 and 69.

Operation of the new level control mechanism involves operation of the automatic-manual control switch 50 to depress it from the automatic position shown to the manual position wherein its blade connects contacts 49 and 52 which energizes circuits for the manual operation of the conveyor when blade 85 is manually moved to contact either the up-button 21 or the down-button 22.

Figure 12:
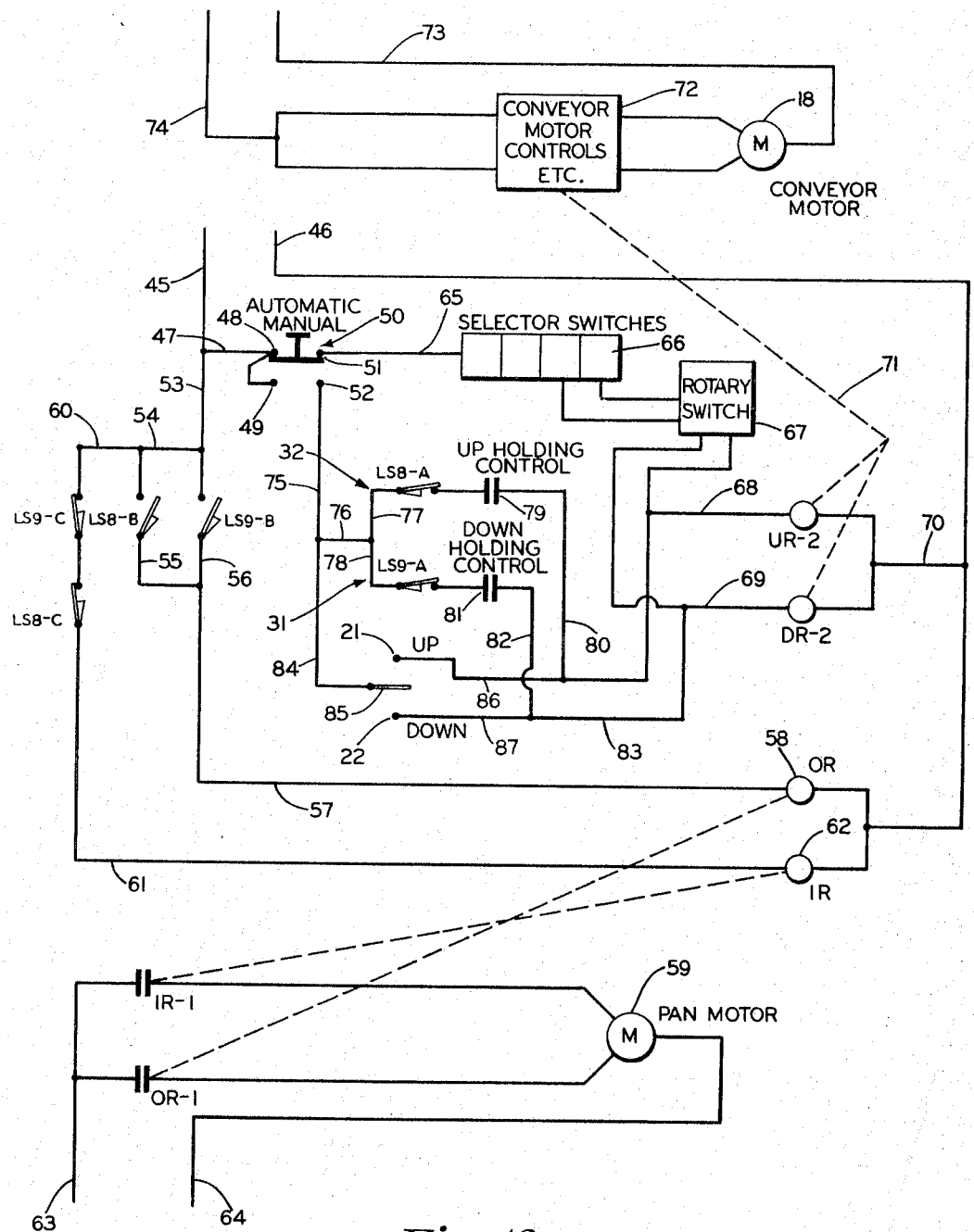
FIG. 12 is a wiring diagram for the construction.

Assume that the conveyor is stopped, with the various switches in the position shown in FIGS. 4, 5 and 12, and with pan number seven (VII), for example, opposite work station 4. Assume further that it is desired to move another pan, such as pan X, to the work station by "down" movement of the conveyer as it passes work station 4. Control blade 85 is moved to contact down-button 22. This energizes a circuit from line 45 through wire 47, contacts 48 and 49, blade of switch 50, contact 52, wires 75 and 84, blade 85, down-button 22, wires 87, 83 and 69, down-relay DR–2, wire 70 and line 46. This energizes relay DR–2 operating conveyer motor 18 for "down" conveyer movement and also energizes down-holding control 81.

Blade 85 is held in contact with down-button 22 until the roller 14 corresponding to pan VII moves off of level switch 23 and until pan IX has passed work station 4. Blade 85 then should be released from down-button 22 and the conveyer will stop with pan X at the proper level position at work station 4 by the operation of the improved level control construction.

When control blade 85 is released from down-button 22, LS9–A being closed and down-holding control 81 having been energized, a holding circuit for down-relay DR–2 is provided, bypassing down-button 22. Now when guide roller 14 corresponding to pan X reaches the area of level switch 23, it engages ear 42 of switch 31 actuating switch 31 as shown by the dot-dash position of roller 14 in FIG. 3, to open the contacts of switches LS9–A and LS9–C and to close the contacts of switch LS9–B. The opening of LS9–A contacts deenergizes down-relay DR–2 stopping conveyer motor 18 and the file stops with pan X opposite work station 4. When stopped in this position, LS9–B energizes a circuit to out-relay 58 for "out" movement of the pan motor 59 when desired.

If the conveyer should coast so that roller 14 is at a position such as shown in FIG. 6, after pan X arrives at work station 4 by "down" movement, LS8–A and LS8–C will open and LS8–B will close by actuation of level switch 32 as shown in dot-dash lines in FIG. 6. Operation of the pan motor 59 through suitable controls is still possible because the out-relay 58 is energized by the closed contacts of both of switches LS8–B and LS9–B.

In this manner, there is leeway for the level positioning of the desired pan at the work station 4 between the position of roller 14 as shown in FIG. 3, and that shown in FIG. 6.

Now assume the condition where the manual operation of blade 85 has held the blade against down-button 22 until roller 14 for pan X has actuated switch 31, has passed off switch 31 and has actuated switch 32 as shown in dot-dash lines in FIG. 7. Under these circumstances, switch 31 again moving to normal position has its contacts LS9–A and LS9–C closed and contact LS9–B open. This again energizes the holding circuit bypassing down-button 22 and again energizes down-relay DR–2; and the conveyer continues to run until the next pan XI arrives at the work station 4.

Another facet of the operation of the improved level control mechanism involves the general condition that can occur where there has been excessive coast of the conveyer for some reason so that when stopped, the guide roller 14 has moved past the actuators 42 and 43 of both switches 31 and 32 before the conveyer stops. Under such conditions, the only circuit that can be energized relating to the ejector mechanism or pan motor 59 is through line 61 to in-relay 62 which would drive pan motor 59 in the "in" direction if it had started to move out before the conveyer coasted to a stop with a pan not at a required level position at the work station for movement of the ejector mechanism 20 without damage.

The operation of the improved construction as described avoids difficulties previously experienced with a single level control switch such as illustrated in said applications Ser. Nos. 446,682 and 481,857. In prior constructions, if pressure on the "down" button is not released during manual operation before the level switch is actuated by the arrival of a roller 14, and the "down" button is released after the level switch is actuated, it is possible for the conveyer to coast so that roller 14 releases the level switch. Meanwhile "out" movement of the pan, however, would have started by the ejector mechanism and damage could occur. The new construction avoids this difficulty in normal operation of conveyer as described.

Operation of the device with arrival of a pan at the work station 4 by "up" movement of the conveyer motor through energizing up-relay UR–2 by up-button 21 proceeds in the same manner as described in the "down" movement. FIGS. 8 and 9 illustrate conditions for "up" movement similar to the "down" movement conditions of FIGS. 3 and 7.

Accordingly, the present invention provides a protective device to insure proper arrival of any pan at the proper level at the work station such that a drawer on the pan may be ejected or retracted without damage to the equipment; and provides a construction that avoids the difficulties and eliminates the problems heretofore encountered in the art, thereby achieving the objects set forth and accomplishing the new functions and results described.

The invention has been illustrated and described in connection with the construction and operation of a power file equipped with power mechanism for ejecting and retracting a drawer from a pan located at a proper level at the work station. Fundamentally the problem involved is the proper location of any preselected pan at the work station when moved to the work station so that no damage will be done to the equipment upon movement of a movable part on a pan located at the work station. Accordingly, the invention is not limited to use only in connection with the automatic or power operated movement of drawers on pans at the work station but comprehends control of the equipment to deliver any pan at a proper preselected work station location to prevent damage to any movable part on a pan that can result when a particular pan is not stopped at the proper level at the work station.

In the foregoing description, certain terms have been used for brevity, clearness and understanding; but no unnecessary limitations are to be implied therefrom beyond the requirements of the prior art because such terms are used for descriptive purposes and are intended to be broadly construed.

Moreover the description and illustration of the invention is by way of example and the scope of the invention is not limited to the exact structure shown, because the various parts, components and mechanisms may be varied to provide other structural embodiments without departing from the fundamental concepts, aspects and principles of the invention.

Having now described the features, discoveries and principles of the invention, the construction, assembly, characteristics, operation and use of a preferred form thereof, and the advantageous, new and useful results obtained thereby; the new and useful discoveries, principles, apparatus, combinations, parts, elements, subcombinations, structures, mechanisms and cooperative relationships and arrangements, and mechanical equivalents obvious to those skilled in the art are set forth in the appended claims.

I claim:

1. Manual control mechanism for manually controlling movement of a power file of a type in which is plurality of pans is mounted on an endless conveyer carried by support means for movement in either direction in a continuous orbit of travel having at least one flight of travel in a plane extending parallel with the orbital axes and any selected pan is delivered by power means to a predetermined work station location, in which a movable member is supported on each pan adapted to be moved when any selected pan is at said predetermined work station location, in which the power means includes a drive motor operative to drive the conveyer in either direction, and in which manual control switch means is provided operative upon being manually held actuated selectively in up and down positions to energize up or down movement drive motor circuits for driving the conveyer respectively in up or down directions in said flight of travel past the work station; the mechanism including up and down holding control circuits operably connected respectively with said up and down movement drive motor circuits; conveyer operated level switch means operably connected with said up and down holding control circuits and said manual control switch means; said level switch means being constructed, upon release from actuated position of said manual switch means prior to the arrival of a preselected pan at said predetermined work station location, to operate to maintain the drive motor energized through said holding circuits for conveyer movement until arrival of said preselected pan at said work station location, and to operate to stop said preselected pan at said predetermined work station location upon arrival at said work station location; and said level switch means being constructed, when said manual control switch means is maintained actuated until arrival of said preselected pan at said work station, to operate to maintain said drive motor energized for continued conveyer movement.

2. The construction defined in claim 1 in which the conveyer operated level switch means includes a plurality of switch elements located adjacent the path of conveyer travel, and level switch actuator means carried by the conveyer adapted successively to operate said plurality of switch elements.

3. The construction defined in claim 1 in which the conveyer operated level switch means includes a pair of switch elements located adjacent the path of conveyer travel, a movable switch operator member for each switch element, a switch actuator for each pan carried by the conveyer, and an ear on each switch operator member normally located in the path of switch actuator travel and successively engaged by each switch actuator as each pan passes the level switch means location.

4. The construction defined in claim 1 in which the conveyer operated level switch means includes an upper switch element and a lower switch element, the upper switch element including a pole connected in said down holding control circuit, and the lower switch element including a pole connected in said up holding control circuit.

5. The construction defined in claim 4 including a movable drawer on each pan, drawer-moving mechanism for moving a drawer on a pan located at the predetermined work station location, control circuits for controlling operation of said drawer-moving mechanism, and said upper and lower switch elements each having poles operatively connected in said drawer-moving circuits.

References Cited

UNITED STATES PATENTS

| | | | |
|---|---|---|---|
| 2,976,100 | 3/1961 | Wigley | 312—268 |
| 3,042,472 | 7/1962 | Ibel | 312—268 |
| 3,059,984 | 10/1962 | Handel | 312—223 |
| 3,063,769 | 11/1962 | Graber | 312—223 |
| 3,198,894 | 8/1965 | Krug | 200—11 |
| 3,243,780 | 3/1966 | Bendick et al. | 312—223 X |
| 3,321,260 | 5/1967 | Anders | 312—268 |

JAMES T. McCALL, *Primary Examiner.*